J. B. BARTHOLOMEW.
TRACTOR.
APPLICATION FILED JULY 29, 1912. RENEWED FEB. 19, 1916.
1,199,333.
Patented Sept. 26, 1916.
3 SHEETS—SHEET 1.
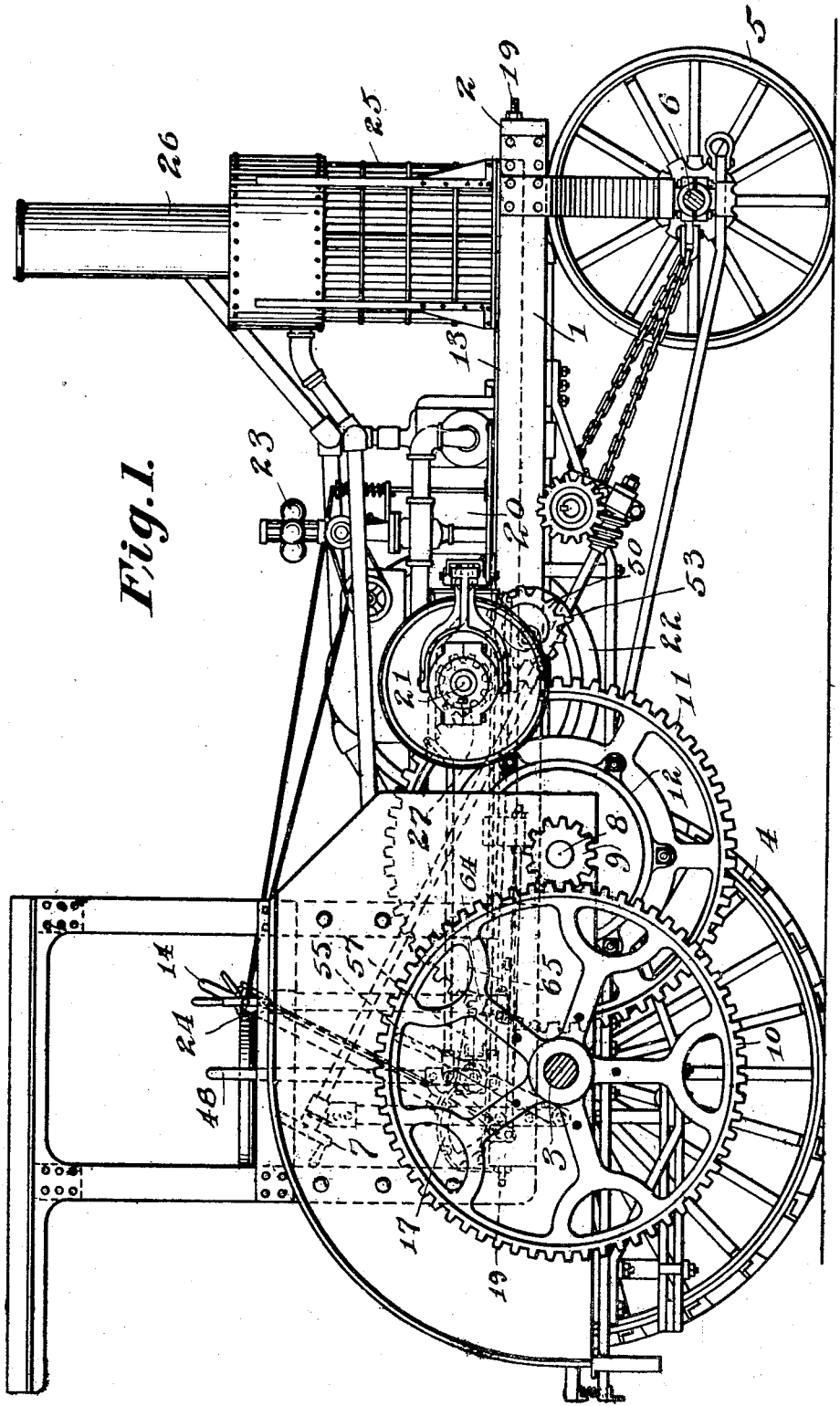

J. B. BARTHOLOMEW.
TRACTOR.
APPLICATION FILED JULY 29, 1912. RENEWED FEB. 19, 1916.
1,199,333.
Patented Sept. 26, 1916.
3 SHEETS—SHEET 2.
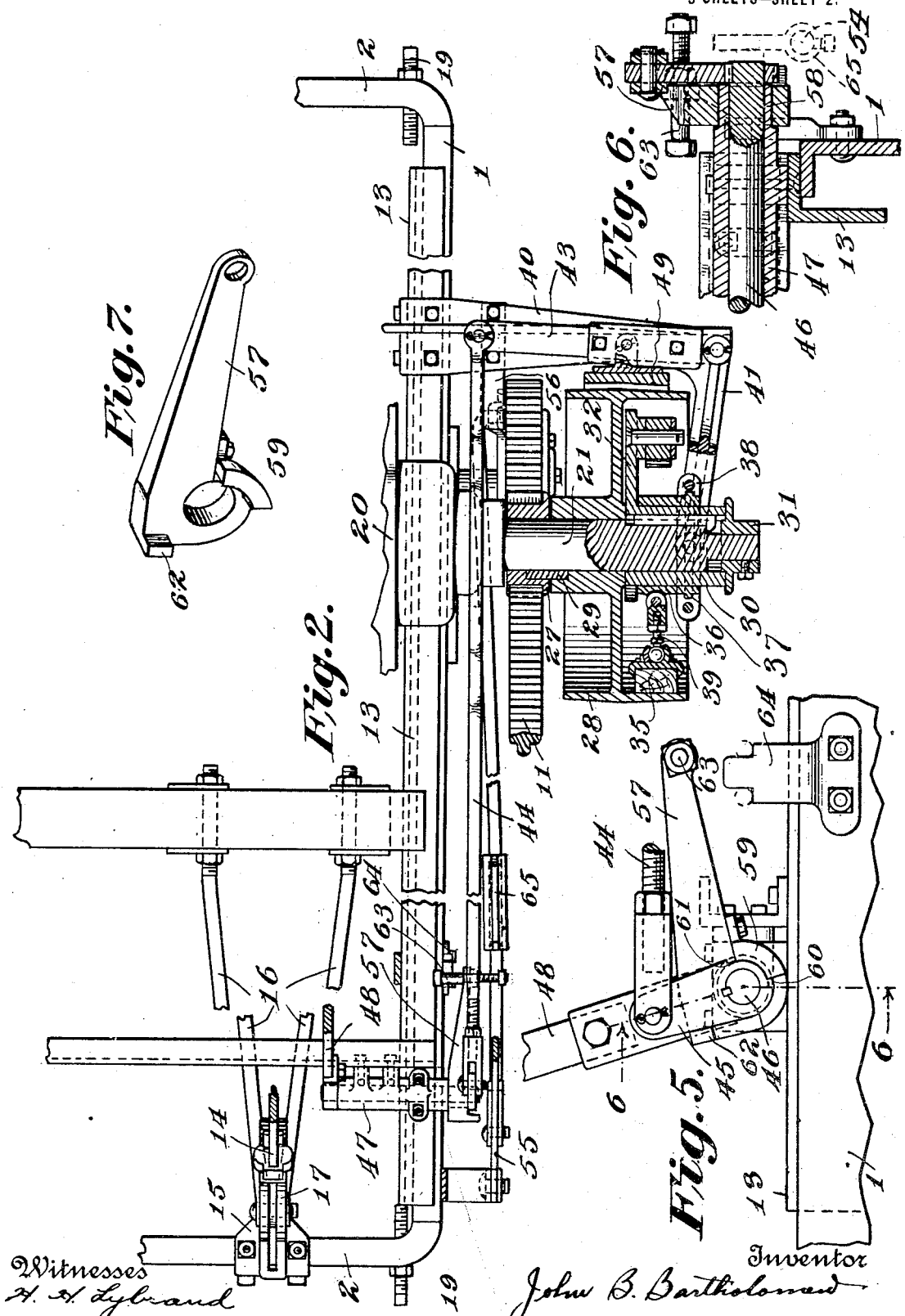

J. B. BARTHOLOMEW.
TRACTOR.
APPLICATION FILED JULY 29, 1912. RENEWED FEB. 19, 1916.
1,199,333.
Patented Sept. 26, 1916.
3 SHEETS—SHEET 3.
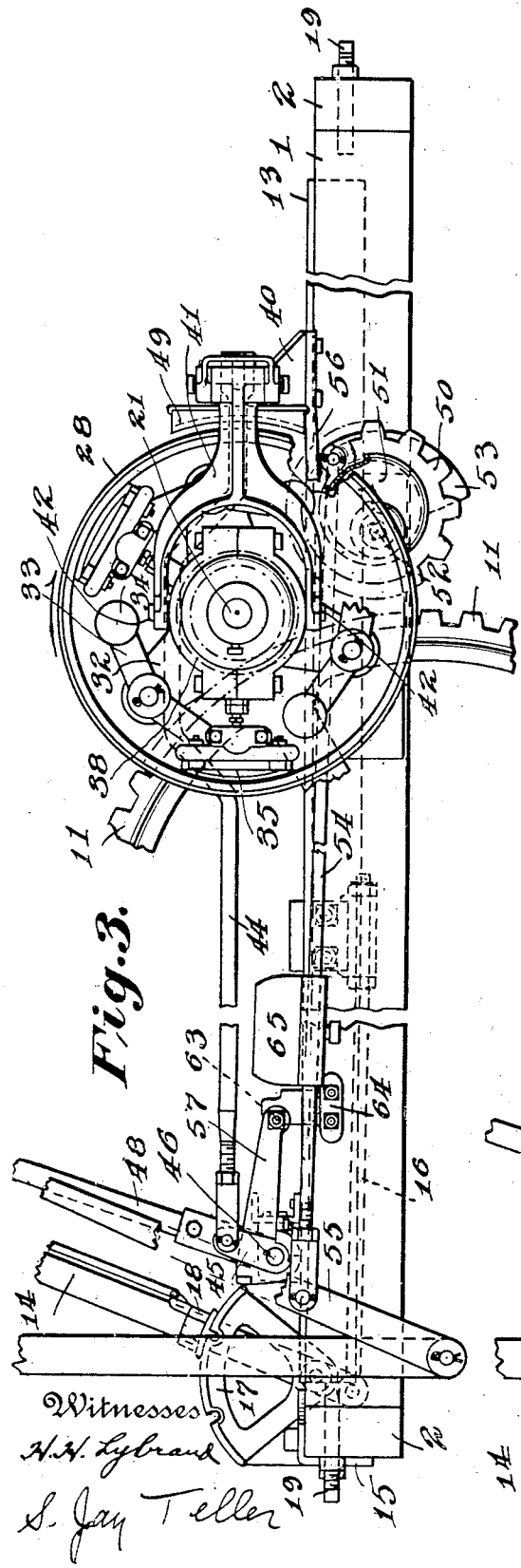
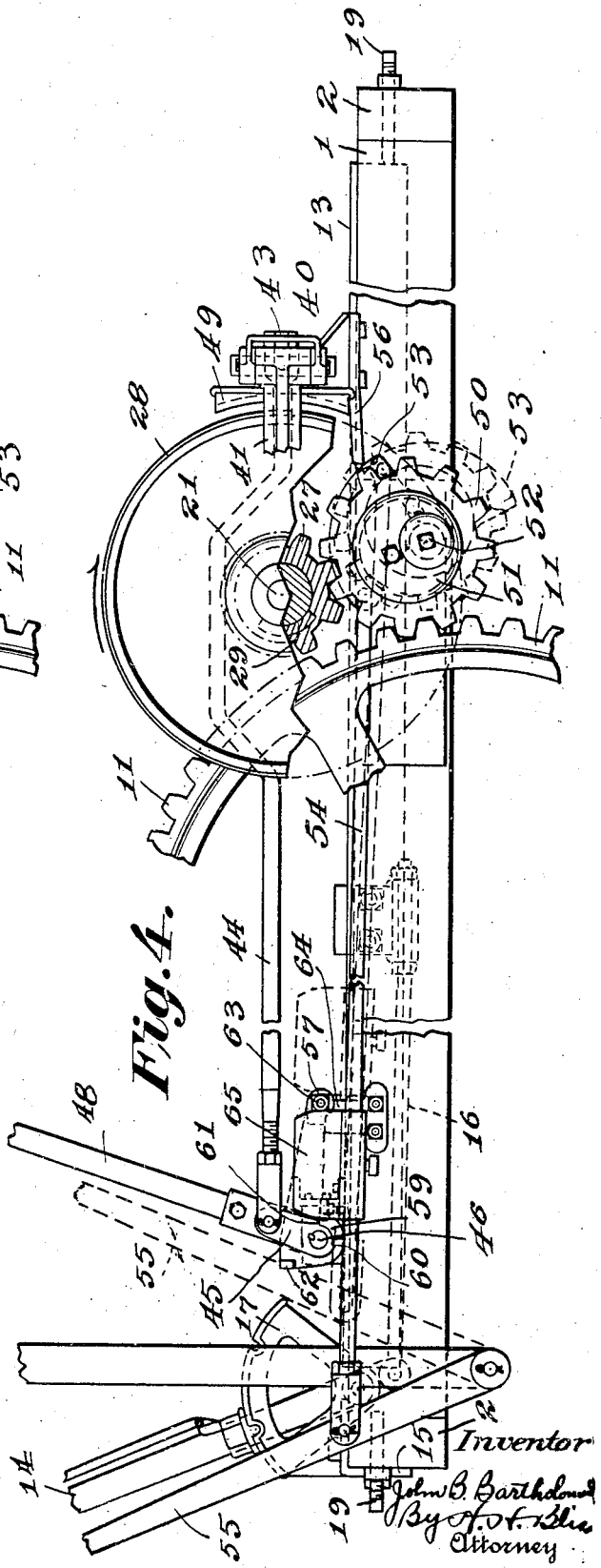

UNITED STATES PATENT OFFICE.

JOHN B. BARTHOLOMEW, OF PEORIA, ILLINOIS, ASSIGNOR TO AVERY COMPANY, OF PEORIA, ILLINOIS, A CORPORATION OF ILLINOIS.

TRACTOR.

1,199,333.  Specification of Letters Patent.  Patented Sept. 26, 1916.

Application filed July 29, 1912, Serial No. 712,094. Renewed February 19, 1916. Serial No. 79,470.

*To all whom it may concern:*

Be it known that I, JOHN B. BARTHOLOMEW, a citizen of the United States, residing at Peoria, in the county of Peoria and State of Illinois, have invented certain new and useful Improvements in Tractors, of which the following is a specification, reference being had therein to the accompanying drawings.

This invention relates to tractors or traction engines adapted to be driven by internal combustion motors.

The principal object of my invention is to provide an improved mechanism for controlling the gearing between the engine and the drive wheels, the controlling mechanism being provided with means for preventing the throwing of the gears into or out of mesh with each other while power is being transmitted.

Of the accompanying drawings which illustrate the preferred form of my invention, Figure 1 is a side elevation, the near ground wheels being omitted for the sake of clearness. Fig. 2 is a fragmentary plan view partly in cross section showing the main frame, the power plant frame, the driving clutch, parts of the gearing and the gearing controlling mechanism. Fig. 3 is a side elevation of the parts shown in Fig. 2 in one position of adjustment. Fig. 4 is a view similar to Fig. 3 showing the parts in another adjustment. Fig. 5 is a fragmentary side view showing a part of the controlling mechanism in a third position of adjustment. Fig. 6 is a fragmentary cross sectional view taken along the line 6—6 of Fig. 5. Fig. 7 is a detail perspective view of the locking arm.

Referring to the drawings, it will be noted that a tractor embodying my invention has two separate and distinct frames. These frames and the parts associated with them will be hereinafter fully described, but, for the present, it will be borne in mind that there is a main traction carriage supported upon the usual four ground wheels and a second or power plant frame which supports all of the elements of the power plant and which is slidable bodily with respect to the frame of the carriage for a purpose to be set forth.

The main frame of the traction engine is preferably rectangular in configuration and comprises two side elements 1 which may advantageously be channel bars arranged with their backs outward and end elements 2 which may also be channel bars similarly arranged.

At the rear of the traction carriage and engaging the transverse axle 3 are two large ground engaging supporting and driving wheels 4. At its forward end the main carriage frame is supported on the ground wheels 5 and the axle 6. Suitable mechanism comprising the hand wheel 7 is provided for turning the forward wheels 5 to steer the tractor.

8 is a transverse shaft mounted in suitable bearings in advance of the axle. This shaft carries at opposite ends pinions 9 which mesh with bull gear wheels 10 secured to the main drive wheels 4.

11 is a large drive wheel mounted for rotation on the shaft 8. Suitable differential gearing is provided between the gear wheel 11 and the two pinions 9. This differential gearing can be arranged in any desired way, but I prefer to provide a casing 12 within which can be mounted differential driving pinions meshing with suitable gears secured respectively to the right hand pinion 9 and to the shaft 8. The right hand pinion is rotatable with respect to the shaft and the left hand pinion is keyed to it. In this way power can be transmitted from the gear wheel 11 differentially to the two pinions 9 and from them to the drive wheels 4.

The slidable power plant frame comprises two main side elements 13 of which one is shown in the drawings. These elements are suitably tied together by cross members and are arranged to rest directly upon the corresponding elements 1 of the main traction frame. The entire power plant is mounted upon these two elements 13 either directly or through the cross pieces.

14 is a lever pivoted at its lower end to a bracket 15 on the rear member 2 of the main frame. Links 16, 16 connect this lever to the power plant frame which is movable longitudinally of the main frame. By moving the lever forward or backward about its pivot, the power plant frame may be moved backward or forward. By means of a notched segment 17 and a hand controlled latch 18 the lever, and consequently the frame, may be locked in either position of adjustment. Preferably screws 19, 19 are provided for limiting the extent of movement of the power plant frame. By means of these screws the extent of movement can be determined more accurately than when dependence is placed upon the lever alone.

20 represents as a whole the internal combustion motor or engine by means of which power is supplied to drive the traction engine or for other purposes. A motor of any suitable type may be used, but in the drawings I have shown a motor provided with two horizontal oppositely disposed cylinders. The motor is suitably supported on the frame elements 13 and is arranged with its crank shaft 21 extending transversely. At one end of the shaft 21 there is provided a fly wheel 22.

23 represents a governor for the engine which may be of any usual or preferred type. Suitable controlling means are provided within reach of the operator at 24.

25 represents a radiator or cooler for the water which is used to cool the engine, and 26 represents a stack through which the exhaust gases can pass.

As shown in Fig. 2 a pinion 27 and a belt wheel 28 are rotatably mounted on the end of the motor shaft 21 opposite to that on which is locked the fly wheel 22. The pinion and belt wheel are connected with each other, but not with the shaft, by means of a key 29. The position on the shaft of the pinion 27 is such that it can mesh with the drive gear wheel 11 when the power plant frame is in proper position.

A clutch is provided for connecting the belt wheel 28 and the pinion 27 with the motor shaft 21. This clutch may be of any one of a number of types, but in the drawings I have shown a clutch which I consider especially well adapted for this purpose.

30 is a sleeve keyed to the outer end of the shaft 21 and is held in place by a collar 31. This sleeve 30 is provided with a number (preferably three) of arms 32 which are positioned at points within the rim of the wheel 28. Pivotally connected to each of the arms 32 is a lever 33 which carries at one end a weight 34 and at its other end a shoe 35 adapted to frictionally engage the inner surface of the rim of the wheel 28. This shoe may be constructed of wood or other suitable material. Slidably mounted upon the sleeve 30 is a second sleeve 36 which is provided near its outer end with an annular flange rib 37.

38 is a collar formed in two parts and adapted to fit over and engage the flange 37 on the sleeve 36. Between the shoe end of each of the levers 33 and the sleeve 36 there is provided a strut or thrust connection 39. Each strut has a ball and socket connection with its lever 33 and a pivotal connection with the sleeve 36. Each strut is preferably made up of two parts which are threaded together and so arranged that by turning one of them with respect to the other the length of the strut can be adjusted. The arrangement is such that when the sleeve 36 is in its innermost position, as shown in Fig. 2, the shoes 35 will be held in firm engagement with the inner surface of the wheel. When the sleeve is in its outer position the levers 33 will be swung inward and the shoes 35 withdrawn from engagement with the wheel. The lengths of the struts 39 can be adjusted from time to time in the manner described to compensate for wear on the shoes.

40 is a horizontal bracket adjacent the clutch and secured at its inner end to the right hand power plant frame element 13. Mounted for movement about a vertical pivot at the outer end of the bracket 40 is a bell crank having one arm 41 forked and provided with apertures to receive the oppositely disposed trunnions 42 on the collar 38. The other arm 43 of the bell crank extends inward and has pivotally connected to its inner end a link 44 which extends rearward and is pivotally connected to an arm 45 keyed on a transverse rock shaft 43. This rock shaft 46 is mounted in a bearing tube 47 which is secured to one of the cross pieces of the power plant frame. At the other end of the rock shaft 46 is a hand lever 48 by means of which the shaft can be moved by the operator. With the parts in the position shown in Figs. 2 and 3 the clutch is operative and the belt wheel 28 and the pinion 27 are connected to the engine shaft 21. Inasmuch as each strut 39 is parallel to the line of force reaction between the corresponding shoe and the rim of the wheel, there is no tendency for the clutch to be thrown out of operation. The clutch can, however, be very easily thrown out of operation by moving the hand lever 48 rearward to the position shown in Fig. 5. By moving this lever the sleeve 36 is moved longitudinally and a corresponding inward movement of the shoes takes place. The counterweights 34 on the levers 33 serve to offset the tendency of the shoes to move outward under the influence of centrifugal force.

Mounted upon the arm 43 of the bell crank is a brake shoe 49 which is formed to engage the outer surface of the belt wheel 28. This brake shoe is so arranged that it will be automatically brought into engagement with the wheel whenever the parts are moved to disengage the clutch. This brake shoe serves to very quickly stop the rotation of the belt wheel and of the pinion 27.

As has been before stated the power plant, together with its supporting frame, can be bodily moved longitudinally of the main carriage frame by means of the lever 14. The arrangement of parts is such that when the power plant is in its rear position the pinion 27 on the motor shaft meshes with the main drive wheel 11 as indicated in Figs. 2 and 3. When the power plant is in its forward position, the pinion will be out of mesh with the gear as indicated in Fig. 4.

50 is a reversing gear which can be moved to mesh with the drive gear 11 and the pinion 27 to transmit power from the pinion to the gear in the reverse direction when the pinion and the gear are separated as indicated in Fig. 4. The gear 50 is rotatably mounted upon the bearing 51 which is eccentrically mounted for oscillation about a pin having an axis at 52. The eccentric 51 is provided with a flange 53 concentric with the axis at 52.

54 is a link having a pivotal connection at its forward end to the eccentric bearing 51 and at its rear end to a hand lever 55 pivoted to the main frame. By means of this hand lever the eccentric bearing 51 can be rocked about its axis to throw the gear 50 from its inoperative position, as shown in Fig. 3, to its operative position in mesh with the pinion 27 and the gear 11, as shown in Fig. 4.

In order that the gear 50 may not be moved into engaging position when the pinion 27 is not out of mesh with the gear 11, and in order to prevent rearward movement of the power plant when the gear 50 is in operative position, I provide a stop 56 which may conveniently be mounted upon the bracket 40 before referred to. This stop is so positioned that it will engage the flange 53 on the eccentric 51, when the eccentric is not in the extreme position shown in Fig. 3, and positively locking the power plant frame against rearward movement. This stop 56 also serves to prevent movement of the eccentric when the power plant frame is in its rear position as shown in Fig. 3. It will be seen that this stop serves to positively prevent the gears becoming all engaged at the same time and thereby injured.

It is very desirable, if, in fact, not essential, that the gears be disengaged from the engine while being shifted, and in order to positively prevent any shifting of the gears while power is being transmitted, I have provided means for locking the power plant frame against movement while the clutch is engaged, and means for locking the reversing gear 50 against movement into or out of operative position while the clutch is engaged.

The device for locking the frame against movement comprises an arm 57 freely journaled upon an extension 58 of the bearing sleeve 47 for the shaft 46. The arm 57 is provided with an arcuate stop 59 arranged to extend into and engage the ends 60 and 61 of a recess formed in the lower end of the arm 45. The parts 60 and 61 are so located with respect to the stop 59 that a certain amount of lost motion is permitted between the arm 45 and the arm 57. Preferably a second stop 62 is provided on the arm 57, this stop being arranged to be engaged by the rear side of the arm 45 at the same instant that the part 60 engages the stop 59. The arm 57 carries at its forward end a transverse pin 63.

64 is a stop secured to the main frame of the tractor. This stop is of such a size and is so positioned that it will be engaged at one side by the pin 63 when the power plant frame is in its forward position, and at the other side when the power plant frame is in its rear position. It will be observed that whenever the lever 48 and the attached parts are in position to hold the clutch engaged, the arm 57 is permitted to fall by gravity into position to bring the pin into locking engagement with the stop 64. The pin can be disengaged from the stop only when the lever 48 has been moved sufficiently to cause the arm 45 to engage the stops on the arm 57, and this engagement takes place only after the arm 45 has been moved through a considerable angle. In this way there is an assurance that the clutch will be completely disengaged and the brake 49 fully applied before the slidable engine frame is released to permit its being moved by the lever 14. It will be understood that with the construction which I have described the pinion 27 cannot be brought into or out of mesh with the gear 11 while power is being transmitted.

Preferably I also provide means for preventing the movement of the reversing gear 50 into and out of operative position while the clutch is engaged. As shown in the drawings, this means comprises a stop 65 secured to the rod 54. This stop 65 is so shaped and positioned that it is engaged by the pin 63 to prevent the reversing gear 50 being thrown out while the clutch is engaged as shown in Fig. 4. When the parts are in the position shown by dotted lines in Fig. 4, the other end of the stop 65 is engaged by the pin and the gear 50 cannot be thrown into operative position with the clutch engaged.

I do not herein claim the movable power plant and the power plant frame nor do I claim the specific arrangement of gearing which I have shown, as these features are the invention of another. And I do not herein claim the radiator at the front end of the machine and the parts coöperating with it, as these are covered by my copending application for tractors, Serial Number 712,684, filed August 1st, 1912.

What I claim is:

1. In a tractor, the combination of a main frame, driving and steering wheels upon which the main frame is supported, a power plant frame movably mounted on the main frame, means for moving the power plant frame forward and backward with respect to the main frame, an engine mounted on the power plant frame and movable therewith, a rotatable gear axially fixed on the main frame and operatively connected with the driving wheels, a second rotatable gear axially fixed on the movable power plant frame and adapted to engage with the said gear on the main frame when the power plant frame is in one position and to be disengaged when the power plant frame is in another position, a power transmitting mechanism between the engine and the gear on the power plant frame comprising a manually controllable clutch, and an automatically operative lock for holding the power plant frame against movement with respect to the main frame when the said clutch is engaged for the transmission of power.

2. In a tractor, the combination of a main frame, driving and steering wheels upon which the main frame is supported, a power plant frame movable forward and backward on the main frame, a device for locking the power plant frame against movement with respect to the main frame, manually controllable devices for releasing the locking device and moving the power plant frame forward or backward with respect to the main frame, an engine mounted on the power plant frame and movable therewith, a rotatable gear axially fixed on the main frame and operatively connected with the driving wheels, a second rotatable gear axially fixed on the movable power plant frame and adapted to engage with the said gear on the main frame when the power plant frame is in one position and to be disengaged when the power plant frame is in another position, a power transmitting mechanism between the engine and the gear on the power plant frame comprising a clutch, and a connection between the clutch and the devices for unlocking and moving the power plant frame for disengaging the clutch whenever the power plant frame is moved.

3. In a tractor, the combination of a main frame, driving and steering wheels upon which the main frame is supported, a power plant frame movable forward and backward on the main frame, a device for locking the power plant frame against movement with respect to the main frame, manually rotatable devices for releasing the locking device and moving the power plant frame forward or backward with respect to the main frame, an engine mounted on the power plant frame and movable therewith, a rotatable gear axially fixed on the main frame and operatively connected with the driving wheels, a second rotatable gear axially fixed on the movable power plant frame and adapted to engage with the said gear on the main frame when the power plant frame is in one position and to be disengaged when the power plant frame is in another position, a power transmitting mechanism between the engine and the gear on the power plant frame comprising a clutch, a brake for that part of the power transmitting mechanism which is directly connected with the gear, and a train of connections between the clutch and the brake on the one hand and the devices for unlocking and moving the power plant frame on the other hand for disengaging the clutch and applying the brake whenever the power plant frame is moved.

4. In a tractor, the combination of a main frame, driving and steering wheels upon which the frame is supported, a power plant frame movably mounted on the main frame, means for moving the power plant frame forward and backward with respect to the main frame, an engine mounted on the power plant frame and movable therewith, a rotatable gear axially fixed on the main frame and operatively connected with the driving wheels, a second rotatable gear axially fixed on the movable power plant frame and adapted to engage with the said gear on the main frame when the power plant frame is in one position and to be disengaged when the power plant frame is in another position, a power transmitting mechanism between the engine and the gear on the power plant frame comprising a manually controllable clutch, an automatically operative lock for holding the power plant frame against movement with respect to the main frame when the said clutch is engaged for the transmission of power, a reversing gear movable into engagement with the said direct gears on the main frame and on the power plant frame when the said gears are out of engagement with each other, and a lock for preventing the movement of the said reversing gear into engaging position when the said direct gears are in engagement with each other.

5. In a tractor, the combination of a main frame, driving and steering wheels upon which the main frame is supported, a power plant frame movably mounted on the main frame, means for moving the power plant frame forward and backward with respect to the main frame, an engine mounted on the power plant frame and movable therewith, a rotatable gear axially fixed on the main frame and operatively connected with the driving wheels, a second rotatable gear axially fixed on the movable power plant frame and adapted to engage with the said gear on the main frame when the power plant frame is in one position and to be disengaged when the power plant frame is in another position, a power transmitting mechanism between the engine and the gear on the power plant frame comprising a manually controllable clutch, an automatically operative lock for holding the power plant frame against movement with respect to the main frame when the said clutch is engaged for the transmission of power, a reversing gear movable into engagement with the said direct gears on the main frame and on the power plant frame when the gears are out of engagement with each other, and a second lock supplemental to the aforesaid lock for holding the power plant frame against movement when the reversing gear is in engaging position, the said second lock being independent of the engagement or disengagement of the clutch.

6. In a tractor, the combination of a main frame, driving and steering wheels upon which the main frame is supported, an engine mounted on the frame, power transmitting mechanism between the engine and the driving wheels comprising a manually controllable clutch and two direct gears one of which is movable into and out of mesh with the other, a lock operatively connected with the said clutch for holding the said movable gear in or out of engagement with the other gear when the clutch is engaged, a reversing gear movable into position to mesh with the two aforesaid direct gears when they are out of engagement with each other, and a second lock connected with the movable direct gear for holding the reversing gear out of mesh with the direct gears whenever they are in engagement with each other.

7. In a tractor, the combination of a main frame, driving and steering wheels upon which the main frame is supported, an engine mounted on the frame, power transmitting mechanism between the engine and the driving wheels comprising a manually controllable clutch and two direct gears one of which is movable into and out of mesh with the other, a lock operatively connected with the said clutch for holding the said movable gear in or out of mesh with the other gear when the clutch is engaged, a reversing gear movable into position to engage with the two aforesaid direct gears when they are out of engagement with each other, and a second lock supplemental to the aforesaid lock and connected with the reversing gear for holding the movable direct gear out of engagement with the other direct gear when the reversing gear is in engaging position, the said second lock being independent of the engagement or disengagement of the clutch.

8. In a tractor, the combination of a main frame, driving and steering wheels upon which the main frame is supported, a power plant frame movably mounted on the main frame, means for moving the power plant frame forward and backward with respect to the main frame, an engine mounted on the power plant frame and movable therewith, a rotatable gear axially fixed on the main frame and operatively connected with the driving wheels, a second rotatable gear axially fixed on the movable power plant frame and adapted to engage with the said gear on the main frame when the power plant frame is in one position and to be disengaged when the power plant frame is in another position, a power transmitting mechanism between the engine and the gear on the power plant frame comprising a manually controllable clutch, an automatically operative lock for holding the power plant frame against movement with respect to the main frame when the said clutch is engaged for the transmission of power, a reversing gear movable into engagement with the said direct gears on the main frame and on the power plant frame when the gears are out of engagement with each other, and a second automatically acting lock supplemental to the aforesaid lock for holding the reversing gear against movement into engaging position when the clutch is in engagement and when the power plant frame is in position to hold the direct gears out of engagement.

9. In a tractor, the combination of a main frame, driving and steering wheels upon which the main frame is supported, an engine mounted on the frame, power transmitting mechanism between the engine and the driving wheels comprising a manually controllable clutch and two direct gears one of which is movable into and out of mesh with the other, a lock operatively connected with the said clutch for holding the said movable gear in or out of mesh with the other gear when the clutch is engaged, a reversing gear movable into position to engage with the two aforesaid direct gears when they are out of engagement with each other, and a second automatically acting lock supplemental to the aforesaid lock for holding the reversing gear out of engaging position when the clutch is engaged and when the movable direct gear is out of engagement with the said direct gear.

In testimony whereof, I affix my signature, in presence of two witnesses.

JOHN B. BARTHOLOMEW.

Witnesses:
J. M. CALDWELL,
A. L. GREGORY.